(12) United States Patent
Yan et al.

(10) Patent No.: US 7,442,567 B2
(45) Date of Patent: Oct. 28, 2008

(54) METHOD FOR FABRICATING TRANSFLECTIVE LIQUID CRYSTAL DISPLAY

(75) Inventors: Tzu-Min Yan, Miao-Li (TW); Chien-Ting Lai, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 138 days.

(21) Appl. No.: 11/642,141

(22) Filed: Dec. 20, 2006

(65) Prior Publication Data

US 2007/0148802 A1    Jun. 28, 2007

(30) Foreign Application Priority Data

Dec. 23, 2005  (TW)  .............................. 94146342 A

(51) Int. Cl.
  *H01L 21/00*  (2006.01)
  *H01L 21/336*  (2006.01)
(52) U.S. Cl. ..................... 438/30; 438/29; 438/257; 257/E21.19; 257/E21.582
(58) Field of Classification Search ............ 257/E21.19, 257/E21.582
See application file for complete search history.

(56) References Cited

U.S. PATENT DOCUMENTS

| | | | |
|---|---|---|---|
| 7,142,271 B2 | 11/2006 | Ko et al. | |
| 2005/0162597 A1* | 7/2005 | Wachi | ......................... 349/138 |
| 2006/0290872 A1* | 12/2006 | Morii et al. | ................. 349/156 |

* cited by examiner

*Primary Examiner*—Scott B. Geyer
*Assistant Examiner*—Mohsen Ahmadi
(74) *Attorney, Agent, or Firm*—Wei Te Chung

(57) ABSTRACT

An exemplary method for fabricating a transflective liquid crystal display is provided. The transflective liquid crystal display includes a substrate (200) having a transmission region (201) and a reflection region (202). The method includes: forming a transparent electrode layer (210), a buffer layer (220), and a reflective metal layer (230) on the substrate; forming a photo-resist layer (240) on the reflective metal layer; providing a photo-mask (300) comprising a first portion corresponding to the transmission region and a second portion corresponding to the reflection region, transmittance of the first portion being greater than transmittance of the second portion; exposing the photo-resist layer using the photo-mask and developing the exposed photo-resist layer; ashing the residual photo-resist in the transparent region; etching the reflective metal layer and the buffer layer in the transmission region; and removing the residual photo-resist in the reflection region.

19 Claims, 3 Drawing Sheets

METHOD FOR FABRICATING TRANSFLECTIVE LIQUID CRYSTAL DISPLAY

FIELD OF THE INVENTION

The present invention relates to methods for fabricating transflective liquid crystal displays, and particularly to a method for fabricating a transflective liquid crystal display which utilizes a photo-mask having slits.

GENERAL BACKGROUND

Recently, LCDs that are light and thin and have low power consumption characteristics have been widely used in office automation equipment, video units and the like. Among LCD products, there are following three types of LCD devices commercially available: a reflection type LCD device utilizing ambient light, a transmission type LCD device utilizing backlight, and a transflective type LCD device equipped utilizing ambient light and backlight.

With a reflection type LCD device, an image display becomes less visible in a poorly lit environment. In contrast, a display of a transmission type LCD device appears hazy in strong ambient light (e.g., outdoor sunlight). Thus researchers seek to provide an LCD device capable of functioning in both modes so as to yield a satisfactory display in any environment. In due course, a transflective type LCD device was developed.

In order to increase a brightness of a reflection region, a plurality of bumps having a curved surface are formed on the reflection region. A method for fabricating the bumps includes the following steps: providing a substrate; coating a photo-resist layer on the substrate; exposing the photo-resist layer using a photo-mask having a predetermined pattern; developing the exposed photo-resist layer, thereby forming step structures; heating the photo-resist layer to make the photo-resist reflow, thereby forming bumps having a curved surface.

However, the conventional method for fabricating the transflective liquid crystal display includes too many photo-mask processes to form a reflection electrode and the bumps, thus having high cost.

What is needed, therefore, is a method for fabricating transflective liquid crystal display that can overcome the above-described problem.

SUMMARY

In one embodiment, a method for fabricating a transflective liquid crystal display is provided. The transflective liquid crystal display. includes a semi-fabricated substrate. The substrate includes a transmission region and a reflection region. The method includes: forming a transparent electrode layer, a buffer layer, and a reflective metal layer on the substrate; forming a photo-resist layer on the reflective metal layer; providing a photo-mask comprising a first portion corresponding to the transmission region of the substrate and a second portion corresponding to the reflection region of the substrate, transmittance of the first portion being greater than transmittance of the second portion; exposing the photo-resist layer using the photo-mask and developing the exposed photo-resist layer, such that a thickness of residual photo-resist in the reflection region is greater than a thickness of residual photo-resist in the transmission region; ashing the residual photo-resist in the transparent region; etching the reflective metal layer and the buffer layer in the transmission region to expose the transparent electrode layer in the transparent region; and removing the residual photo-resist in the reflection region to expose the reflective metal layer in the reflection region.

Other advantages and novel features will become more apparent from the following detailed description when taken in conjunction with the accompanying drawings. In the drawings, all the views are schematic.

DETAILED DESCRIPTION OF PREFERRED EMBODIMENTS

Referring to FIG. 1 to FIG. 9, a method for fabricating a transflective liquid crystal display according to an exemplary embodiment of the present invention is shown. For simplicity, the following description is couched in terms that relate to the part of the transflective liquid crystal display. The method is described in detail as follows.

Figure 1:
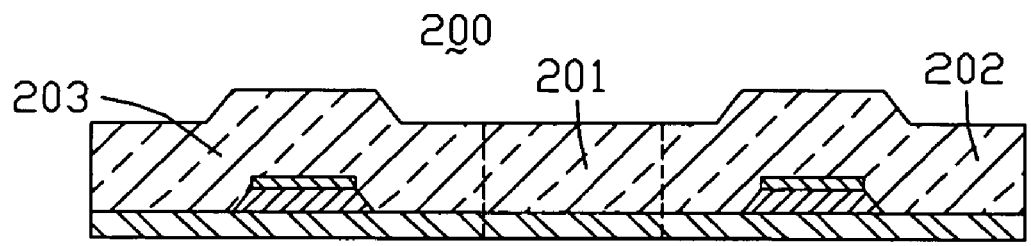
FIG. 1 to FIG. 9 are side cross-sectional views relating to steps of a method for fabricating a transflective liquid crystal display according to an exemplary embodiment of the present invention.

Referring to FIG. 1, a substrate 200 is provided. The substrate 200 is semi-fabricated, and has a gate electrode (not labeled), a semiconductor layer (not labeled), a source electrode (not shown) and a drain electrode (not shown) formed thereon. The substrate 200 includes a transmission region 201, a reflection region 202, and a wiring region 203. The transmission region 201 is located between the reflection region 202 and the wiring region 203.

Figure 2:
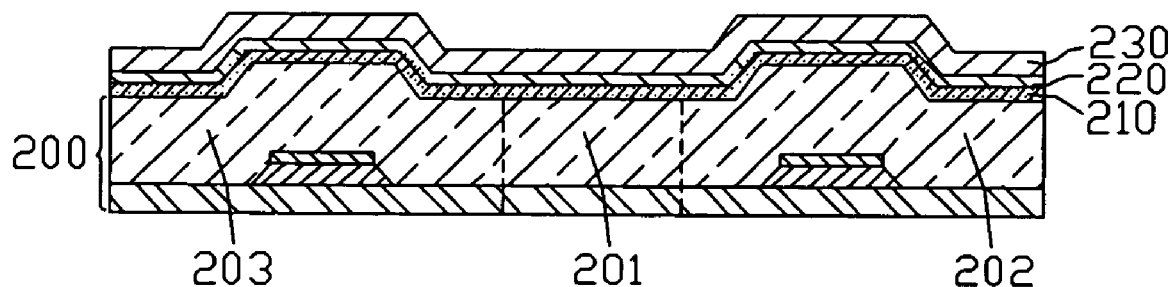

Referring to FIG. 2, a transparent electrode layer 210, a buffer layer 220, and a reflective metal layer 230 is sequentially formed on the substrate 200. The transparent electrode layer 210 can be made from indium tin oxide (ITO) or indium zinc oxide (IZO). The reflective metal layer 230 can be made from aluminum, silver, or aluminum neodymium alloy. The buffer layer 220 can be made from molybdenum or titanium, and is used to insulate the transparent electrode layer 210 and the reflective metal layer 230 because electrochemistry reaction occurs if the transparent electrode layer 210 and the reflective metal layer 230 make contact. The method of forming these layers can be chemical vapor deposition (CVD) or physical vapor deposition (PVD).

Figure 3:
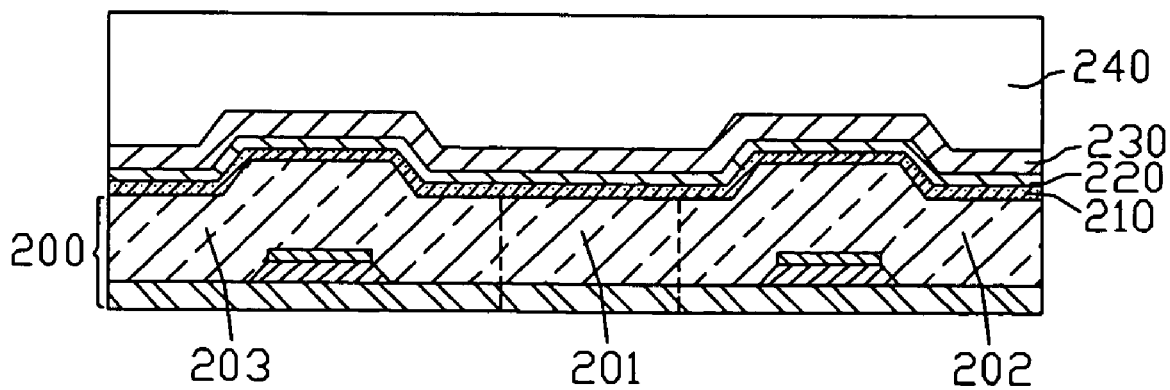

Referring to FIG. 3, a photo-resist layer 240 is formed on the reflective metal layer 230 by a spin-coating method or a spay-coating method.

Figure 4:
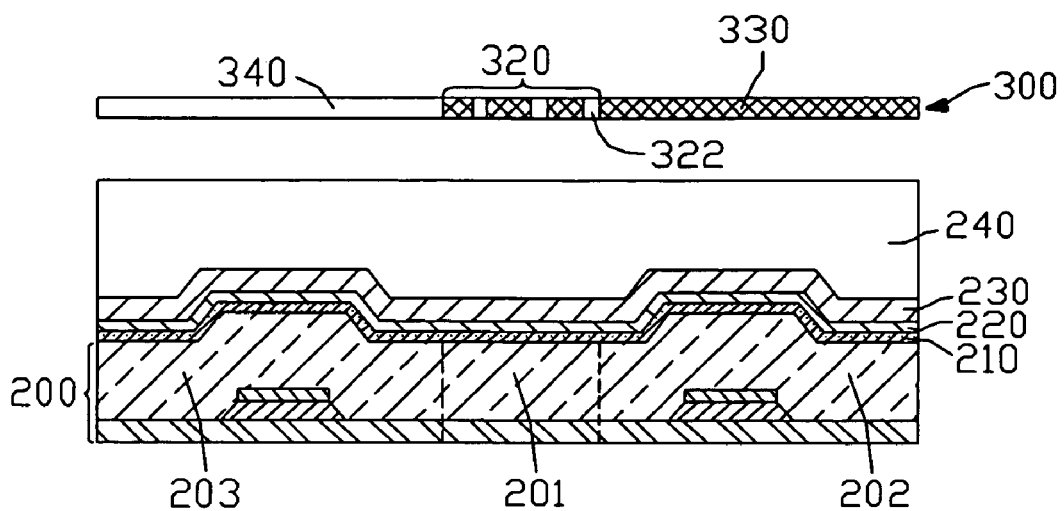
Figure 5:
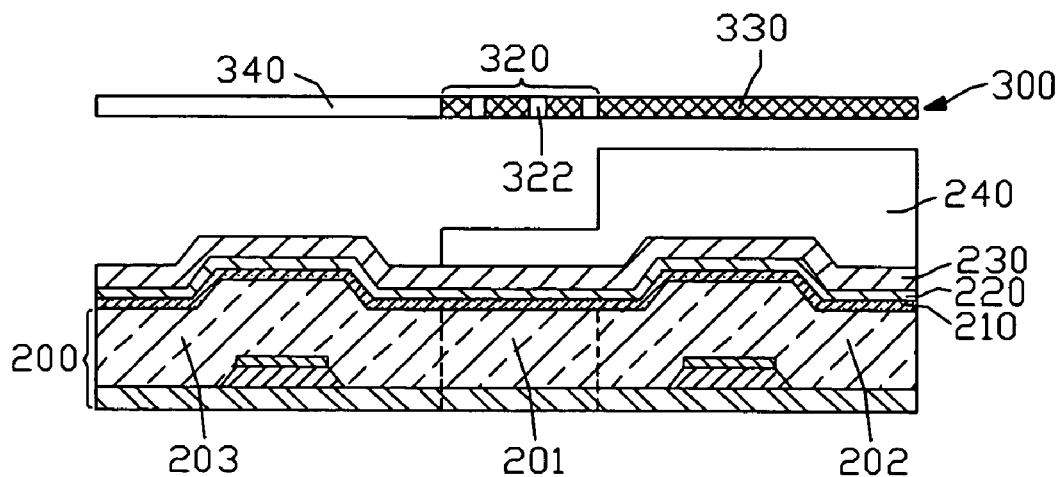

Referring to FIG. 4, a photo-mask 300 is provided, and is aligned with the photo-resist layer 240. The photo-mask 300 includes an opaque portion 330, a transparent portion 340, and a semi-transparent portion 320. The semi-transparent portion 320 has a plurality of slits 322 which have the same width. The transparent portion 340 corresponds to the wiring region 203 of the substrate 200. The semi-transparent portion 320 corresponds to the transmission region 201 of the substrate 200. The opaque portion 330 corresponds to the reflection region 202 of the substrate 200. Ultraviolet light is used to radiate the photo-resist layer 240 via the photo-mask 300, in order to expose the photo-resist layer 240. The photo-resist layer 240 in the wiring region 203 is fully exposed. Because transmittance of the semi-transparent portion 320 is less than transmittance of the transparent portion 340, the photo-resist layer 240 in the transparent region 201 is partly exposed. That is, an exposed thickness of the photo-resist layer 240 in the transparent region 201 is less than that of the photo-resist layer 240 in the wiring region 203. The photo-resist layer 240 in the reflection region 202 is not radiated by the ultraviolet light, and therefore is not exposed. A developer is used to develop the photo-resist layer, so as to remove the exposed photo-resist, thereby forming a step structure. Referring to FIG. 5, the photo-resist layer 240 in the wiring region 203 is fully removed, and a thickness of the residual photo-resist in the transparent region 201 is less than that of the residual photo-resist in the reflection region 202.

Figure 6:
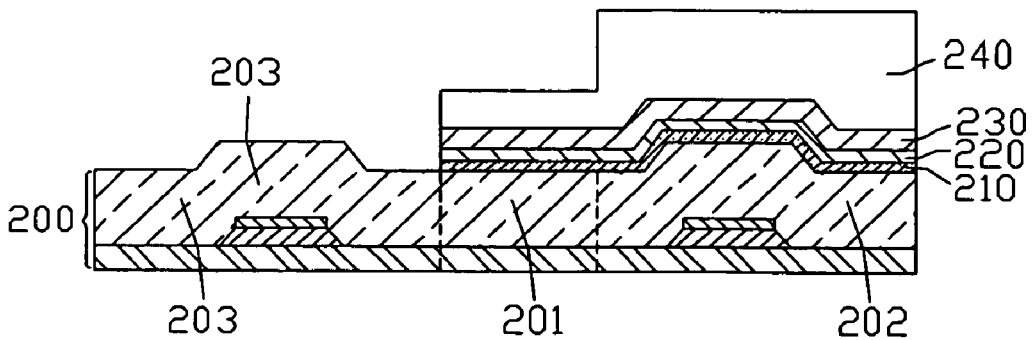

Referring to FIG. 6, the transparent electrode layer 210, the buffer layer 220, and the reflective metal layer 230 in the wiring region 203 are etched. The method of this etching step can be a dry etching method, such as a plasma etching method, or a wet etching method.

Figure 7:
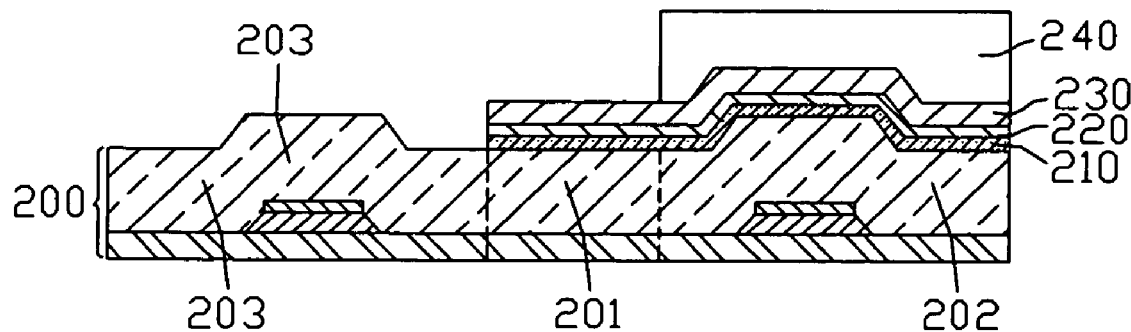

Referring to FIG. 7, oxygen gas or oxygen plasma is used to ash the residual photo-resist. The residual photo-resist in the transparent region 201 is totally removed, thereby exposing the reflective metal layer 230 in the transparent region 201. The residual photo-resist in the reflection region 202 is partly removed.

Figure 8:
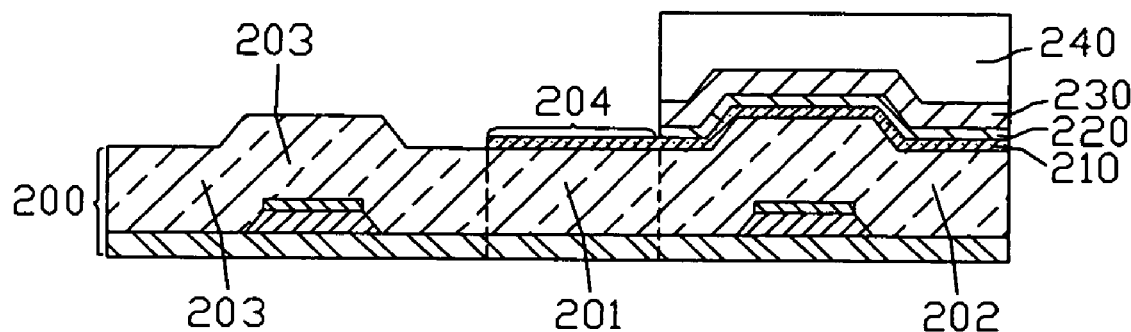

Referring to FIG. 8, the reflective metal layer 230 and the buffer layer 220 in the transparent region 201 are etched, thereby exposing the transparent electrode layer 210 in the transparent region 201, i.e., a transmission electrode 204 of the transflective liquid crystal display.

Figure 9:
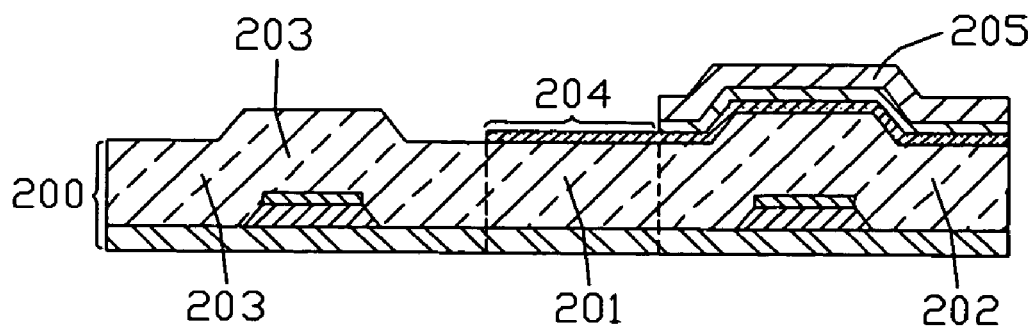

Referring to FIG. 9, the residual photo-resist in the reflection region 202 is removed by acetone or methylethylketone, thereby exposing the reflective metal layer 230 in the reflection region 202, i.e., a reflection electrode 205 of the transflective liquid crystal display.

In summary, the method for fabricating the transflective liquid crystal display includes the step of forming the transmission electrode 204 and the step of forming the reflection electrode 205, which steps are combined together. Compared to the above-described conventional method, in the above-described exemplary method, although a photo-mask 300 having slits is used and an additional ashing step and an additional etching step are added, several photo-mask processes are saved. Therefore, a simplified method at a reduced cost is provided.

Further or alternative embodiments may include the following. In one example, the slits 322 of the photo-mask 300 may have different widths. In further example, the photo-mask 300 may include a first semi-transparent portion instead of the transparent portion 340, a second semi-transparent portion instead of the semi-transparent portion 320, and a third semi-transparent portion instead of the opaque portion, wherein transmittance of the second semi-transparent portion is less than that of the first semi-transparent portion, and is greater than that of the third semi-transparent portion.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A method for fabricating a transflective liquid crystal display, the transflective liquid crystal display comprising a semi-fabricated substrate, the substrate comprising a transmission region and a reflection region, the method comprising:

forming a transparent electrode layer, a buffer layer, and a reflective metal layer on the substrate;

forming a photo-resist layer on the reflective metal layer;

providing a photo-mask comprising a first portion corresponding to the transmission region of the substrate and a second portion corresponding to the reflection region of the substrate, transmittance of the first portion being greater than transmittance of the second portion;

exposing the photo-resist layer using the photo-mask and developing the exposed photo-resist layer, such that a thickness of residual photo-resist in the reflection region is greater than a thickness of residual photo-resist in the transmission region;

ashing the residual photo-resist in the transparent region;

etching the reflective metal layer and the buffer layer in the transmission region to expose the transparent electrode layer in the transparent region; and removing the residual photo-resist in the reflection region to expose the reflective metal layer in the reflection region.

2. The method as claimed in claim 1, wherein the transparent electrode layer is made from indium tin oxide or indium zinc oxide.

3. The method as claimed in claim 1, wherein the reflective metal layer is made from material including any one or more items selected from the group consisting of aluminum, silver, and aluminum neodymium alloy.

4. The method as claimed in claim 1, wherein the buffer layer is made from material including any one or more items selected from the group consisting of molybdenum and titanium.

5. The method as claimed in claim 1, wherein the transparent electrode layer, the buffer layer, and the reflective metal layer are formed on the substrate by a chemical vapor deposition method.

6. The method as claimed in claim 1, wherein the transparent electrode layer, the buffer layer, and the reflective metal layer are formed on the substrate by a physical vapor deposition method.

7. The method as claimed in claim 1, wherein the photo-mask comprises a plurality of slits.

8. The method as claimed in claim 7, wherein the first portion of the photo-mask comprises the slits and the second portion of the photo-mask is opaque.

9. The method as claimed in claim 8, wherein the substrate further comprises a wiring region and the photo-mask further comprises a transparent third portion corresponding to the wiring region of the substrate.

10. The method as claimed in claim 1, wherein the photo-mask comprises a plurality of slits, and the slits have the same width.

11. The method as claimed in claim 1, wherein the photo-mask comprises a plurality of slits, and the slits have different widths.

12. The method as claimed in claim 1, wherein ultraviolet light is used in the exposing step.

13. The method as claimed in claim 1, wherein the residual photo-resist in the transparent region is ashed by oxygen gas or oxygen plasma.

14. The method as claimed in claim 1, wherein the residual photo-resist in the reflection region is removed by acetone or methylethylketone.

15. The method as claimed in claim 1, wherein the substrate further comprises a wiring region, and the photo-mask further comprising a third portion, transmittance of the third portion being greater than transmittance of the first portion, the transparent region being between the wiring region and the reflection region.

16. The method as claimed in claim 15, further comprising etching the reflective metal layer, the buffer layer, and the transparent electrode layer in the wiring region before the ashing step.

17. The method as claimed in claim 16, wherein the method for etching the reflective metal layer, the buffer layer, and the transparent electrode layer in the wiring region is a wet etching method.

18. The method as claimed in claim 17, wherein the dry etching method is a plasma etching method.

19. The method as claimed in claim 16, wherein the method for etching the reflective metal layer, the buffer layer, and the transparent electrode layer in the wiring region is a dry etching method.

* * * * *